US008616114B2

(12) United States Patent
Ribeiro

(10) Patent No.: US 8,616,114 B2

(45) Date of Patent: Dec. 31, 2013

(54) PISTON WITH CENTRAL DIRECTIONAL OIL FLOW AND WRIST PIN LUBRICATION FEATURE AND METHOD OF CONSTRUCTION THEREOF

(75) Inventor: Carmo Ribeiro, Ann Arbor, MI (US)

(73) Assignee: Federal-Mogul Corporation, Southfield, MI (US)

( * ) Notice: Subject to any disclaimer, the term of this patent is extended or adjusted under 35 U.S.C. 154(b) by 980 days.

(21) Appl. No.: 12/713,814

(22) Filed: Feb. 26, 2010

(65) Prior Publication Data

US 2010/0218673 A1 Sep. 2, 2010

Related U.S. Application Data

(60) Provisional application No. 61/155,945, filed on Feb. 27, 2009.

(51) Int. Cl.

*F01B 31/08* (2006.01)
*B23P 15/10* (2006.01)
*F16J 1/00* (2006.01)

(52) U.S. Cl.

USPC ............. 92/186; 92/255; 92/260; 29/888.042

(58) Field of Classification Search

USPC ....... 92/186, 181 R, 216, 219, 222, 231, 255, 92/260; 123/41.34–41.39, 193.6; 29/888.044, 888.04, 888.042, 463, 29/525.14

See application file for complete search history.

(56) References Cited

U.S. PATENT DOCUMENTS

| | | | |
|---|---|---|---|
| 2,317,004 | A | 4/1943 | Wallgren et al. |
| 2,437,824 | A | 3/1948 | Kishline |
| 2,442,438 | A | 6/1948 | Robinson et al. |
| 2,819,936 | A | 1/1958 | Cambeis |
| 3,336,844 | A | 8/1967 | Cornet |
| 3,613,521 | A | 10/1971 | Itano |
| 4,286,505 | A | 9/1981 | Amdall |
| 4,517,930 | A | 5/1985 | Nakano et al. |
| 4,581,983 | A | 4/1986 | Moebus |
| 6,223,710 | B1 | 5/2001 | Franz |
| 6,467,397 | B1 | 10/2002 | Fuchs et al. |
| 6,477,941 | B1 | 11/2002 | Zhu et al. |

(Continued)

FOREIGN PATENT DOCUMENTS

| | | | | |
|---|---|---|---|---|
| EP | 0359932 A2 * | 3/1990 | ............. | F02B 23/06 |
| JP | 04-276119 A | 10/1992 | | |

(Continued)

*Primary Examiner* — Michael Leslie

(74) *Attorney, Agent, or Firm* — Robert L. Stearns; Dickinson Wright, PLLC

(57) ABSTRACT

A piston has a piston body extending along a central axis. The piston body has an upper crown portion and a lower crown portion. The upper crown portion has an upper combustion wall and an at least one annular upper rib depending from the upper combustion wall to a free end. The lower crown portion has at least one annular lower rib extending to a free end that is fixed to the at least one upper rib and an inner gallery floor extending radially inwardly relative to the at least one lower rib. The upper crown portion has an upper post depending from the upper combustion wall along the central axis to a free end. The lower crown portion has a lower post extending upwardly from the inner gallery floor along the central axis to a free end. Together, the upper post and the lower post form a labyrinth passage.

26 Claims, 1 Drawing Sheet

(56) References Cited

U.S. PATENT DOCUMENTS

| | | | | |
|---|---|---|---|---|
| 6,651,549 | B2 | 11/2003 | Zhu et al. | |
| 6,840,155 | B2 | 1/2005 | Ribeiro et al. | |
| 2001/0025568 | A1 | 10/2001 | Kemnitz et al. | |
| 2003/0188633 | A1 * | 10/2003 | Griffiths et al. | 92/208 |
| 2005/0034598 | A1 | 2/2005 | Ribeiro et al. | |
| 2007/0137605 | A1 * | 6/2007 | Scharp | 123/193.6 |

FOREIGN PATENT DOCUMENTS

| | | | |
|---|---|---|---|
| WO | WO 00-53913 | A1 | 9/2000 |
| WO | WO 02-20971 | A1 | 3/2002 |
| WO | WO 2006-060987 | A1 | 6/2006 |

* cited by examiner

PISTON WITH CENTRAL DIRECTIONAL OIL FLOW AND WRIST PIN LUBRICATION FEATURE AND METHOD OF CONSTRUCTION THEREOF

CROSS-REFERENCE TO RELATED APPLICATION

This application claims the benefit of U.S. Provisional Application Ser. No. 61/155,945, filed Feb. 27, 2009, which is incorporated herein by reference in its entirety.

BACKGROUND OF THE INVENTION

1. Technical Field

This invention relates generally to pistons for internal combustion engines, and more particularly to pistons having wrist pin lubrication features.

2. Related Art

Piston constructions having one or two (dual gallery) generally closed oil cooling galleries are known. Dual gallery pistons have an annular, radially outer gallery and a central gallery formed between upper and lower crown portions, wherein the central gallery is typically formed as an open gallery beneath the combustion bowl wall. The outer and central galleries can be isolated from one another or in fluid communication with one another via oil passages. In addition, it is known to provide pin lubrication passages extending from one or both of the galleries to a wrist pin. The lubrication passages can extend into a wrist pin bore of a pin boss and/or through an opening in a lower inner gallery floor between laterally spaced pin bosses. The outer gallery is particularly effective in cooling an outer ring belt region of the piston, while the central gallery is particularly effective in cooling a central crown region, formed in part by an upper combustion wall, which is directly exposed to hot combustion gases. Although these gallery constructions are generally effective in cooling the piston, the oil flow dynamics through the galleries can be improved, with particular regard to the central gallery, thereby enhancing the ability to cool pistons in use.

SUMMARY OF THE INVENTION

A piston has a piston body with a central axis along which the piston body reciprocates within a cylinder bore. The piston body has an upper crown portion with an upper combustion wall against which combustion threes directly act in the cylinder bore and an at least one annular upper rib depending from the upper combustion wall to a free end. The piston body further includes a lower crown portion having at least one annular lower rib extending to a free end that is fixed to the at least one upper rib. The lower crown portion further includes an inner gallery floor extending radially inwardly relative to the at least one lower rib and a pair of pin bosses depending generally from the inner gallery floor with a space provided between the pin bosses for receipt of a small end of a connecting rod. The upper crown portion has an upper post depending from the upper combustion wall along the central axis to a free end. The lower crown portion has a lower post extending upwardly from the inner gallery floor along the central axis to a free end. The free end of the upper post and the free end of the lower post form a labyrinth passage.

In accordance with another aspect of the invention, the upper and lower post extend axially beyond one another and maintain entire clearance with one another.

In accordance with another aspect of the invention, the lower crown post has an oil flow passage extending along the central axis.

In accordance with another aspect of the invention, the lower crown post has an oil flow passage extending substantially transversely to the central axis.

In accordance with another aspect of the invention, a method of constructing a piston is provided. The method includes providing an upper crown portion having an upper combustion wall against which combustion forces directly act in the cylinder bore and at least one annular upper rib depending from the upper combustion wall to a free end with an upper post depending from the upper combustion wall along the central axis to a free end. Further, providing a lower crown portion having at least one annular lower rib extending to a free end and an inner gallery floor extending radially inwardly relative to the at least one lower rib with a pair of pin bosses spaced for receipt of a small end of a connecting rod and having a lower post extending upwardly from the inner gallery floor along the central axis to a free end. Then, fixing the at least one upper rib of the upper crown portion to the at least one lower rib of the lower crown portion and forming a labyrinth passage between the free end of the upper post and the free end of the lower post.

In accordance with another aspect of the invention, the method includes extending the free end of the upper post and the free end of the lower post axially beyond one another.

In accordance with another aspect of the invention, the method includes maintaining the upper post and the lower post in spaced relation from one another.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
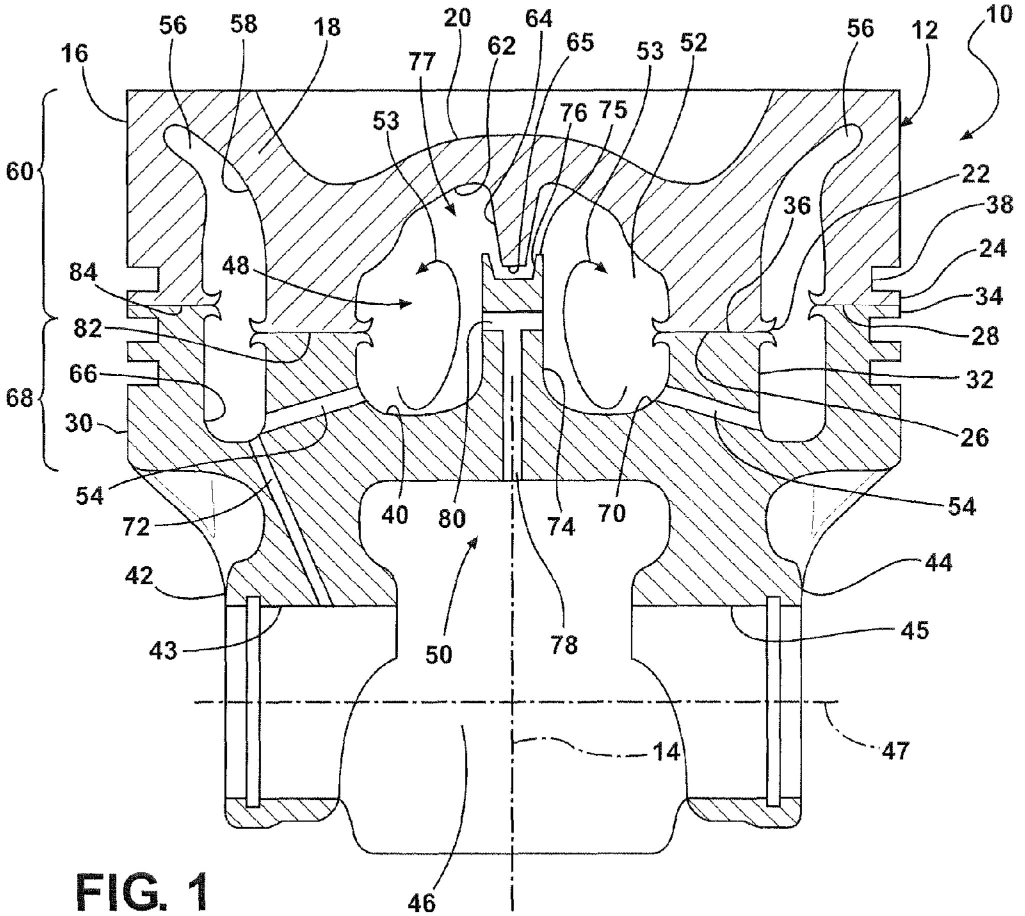
FIG. 1 is a partial cross-sectional view of a piston constructed in accordance with one presently preferred aspect of the invention.

Referring in more detail to the drawings, FIG. 1 illustrates a piston 10 constructed in accordance with one presently preferred aspect of the invention. The piston 10 has a piston body 12, such as can be constructed of steel, for example, extending along a central axis 14 along which the piston body 12 reciprocates within a cylinder bore (not shown). The piston body 12 includes an upper crown portion 16 having an upper combustion wall 18, represented here, by way of example and without limitation, as providing a recessed combustion bowl 20, against which combustion forces directly act in the cylinder bore. The upper crown portion 16 has at least one, and shown here as a pair of annular upper ribs, referred to hereafter as an upper inner rib 22 and upper outer rib 24, depending generally from the upper combustion wall 18 to respective free ends 26, 28. The piston body 12 further includes a lower crown portion 30 having at least one, and shown here as a pair of annular lower ribs, referred to hereafter as a lower inner rib 32 and lower outer rib 34, extending to respective free ends 36, 38 arranged in circumferential alignment and in fixed engagement with the upper free ends 26, 28. The lower crown portion 30 further includes an inner gallery floor 40 extending radially inwardly relative to the lower inner rib 32 and a pair of pin bosses 42, 44 depending generally from the inner gallery floor 40. The pin bosses 42, 44 have respective pin bores 43, 45 aligned along a central horizontal pin axis 47 with a space 46 provided between the pin bosses 42, 44 for receipt of a small end of a connecting rod (not shown). The upper and lower crown portions 16, 30 interact to provide a central directional oil flow control member extending coaxially along the central axis 14, referred to hereafter as oil flow control member 48, having a central wrist pin lubrication feature, referred to hereafter as lubrication feature 50. The flow control member 48 extends through an inner gallery, also referred to as central gallery 52 of the piston 10, thereby providing the central gallery 52 having a toroid configuration. As such, the oil received in the central gallery 52 is caused to flow along a predetermined dynamic flow path indicated generally by the arrows 53. Accordingly, the oil is directed to flow along a generally continuous, uniform path throughout the central gallery 52, thereby facilitating uniform, efficient cooling of the upper combustion wall 18. In addition, the lubrication feature 50 provides a regulated or metered flow of the oil from within the central gallery 52 to the space 46, thereby avoiding overheating ("cooking") the oil within the central gallery 52 and promoting continuous lubrication of the wrist pin joint at the small end of the connecting rod.

The upper crown portion 16 is formed having an annular outer oil gallery pocket 58 extending from the inner and outer upper rib free ends 26, 28 upwardly into an upper ring belt region 60 adjacent the upper combustion wall 18. The upper crown portion 16 is also formed having an annular inner oil gallery pocket 62 extending from the upper inner rib free end 26 upwardly and immediately beneath the combustion bowl 20. In addition, the upper crown portion 16 has an upper post 64 depending coaxially along the central axis 14 from the upper combustion wall 18. The upper post 64 forms a portion of the flow control member 48 and is formed having a predetermined length extending to a free end 65 and a predetermined outer surface configuration.

The lower crown portion 30 is constructed having an annular outer oil gallery pocket 66 extending from the inner and outer lower rib free ends 36, 38 downwardly into a lower ring belt region 68, which, in combination with the upper outer oil gallery pocket 58 forms an outer gallery 56. The lower crown portion 30 also has an annular inner oil gallery pocket 70 extending from the inner lower rib free end 36 downwardly, which, in combination with the upper inner oil gallery pocket 62 forms the central gallery 52. An oil flow passage 72 is formed extending from one of the pin bores 43 upwardly into the bottom most region of the outer oil gallery pocket 66. As such, oil is pumped from the pin bore 43 upwardly into the outer gallery 56. Further, lower crown portion 30 is represented here as having a pair of oil flow passages 54 extending through the lower inner rib 32. The oil flow passages 54 are formed, by way of example and without limitation, descending generally from a lowermost region of the central gallery 52 radially outwardly to a lower most region of the outer gallery 56. In addition, the lower crown portion 30 has a lower post 74 that forms a portion of the flow control member 48. The lower post 74 extends upwardly from the inner gallery floor 40 coaxially along the central axis 14 in coaxial alignment with the upper post 64. The lower post 74 is formed having a predetermined length and outer surface configuration extending to a free end 75. The length and outer surface configuration are such that upon fixing the upper crown portion 16 to the lower crown portion 30, such as via friction welding, for example, the free end 65 of the upper post 64 do not interfere with one another. In the embodiment illustrated, by way of example and without limitation, a counter bore 76 is formed in one of the posts 64, 74, and shown here, by way of example and without limitation, as being formed in the lower post 74, to receive the free end 65 of the upper post 64 in a clearance fit therein. The counterbore 76 has a diameter larger than the outer diameter of the upper post 64 and a depth great enough to provide a clearance between the upper post 64 and the lower post 74. As such, upon fixing the upper crown portion 16 to the lower crown portion 30, a labyrinth seal 77 having a serpentine flow path is established between the upper post 64 and the lower post 74. Accordingly, the upper post 64 and lower post 74 remain detached and spaced radially and entirely from one another, though the upper post free end 65 and the lower post free end 75 extend axially beyond one another. As such, the upper and lower posts 64, 74 do not having any effect on the ability to fix the upper crown portion 16 to the lower crown portion 30.

The lower post 74 further includes the lubrication feature 50, shown here, by way of example and without limitation, as being generally T-shaped, as viewed in axial cross-section, having a vertically extending first oil flow passage, also referred to as a central oil flow passage 78, extending coaxially along the central axis 14. The oil flow passage 78 is intersected by a horizontally extending second oil flow passage, also referred to as cross opening 80, below the counterbore 76, with the cross opening 80 extending generally transversely to the central axis 14 through the lower post 50 to diametrically opposite sides of the annular central gallery 52. The height of the cross opening 80 can be varied in manufacture as desired to provide the desired regulation of oil flow through the oil flow passage 78, and to facilitate establishing a predetermined depth or pool of oil in the lower portion of the central gallery 52. The oil within the central gallery 52 flows through the oil flow passage 78 to facilitate lubricating the wrist pin joint formed at the small end of the connecting rod (not shown).

In accordance with a method of construction of the piston 10, as eluded to above, the method includes forming the respective upper and lower crown portions 16, 30 and fixing them to one another, such as via forming respective friction weld joints 82, 84 between the inner rib free ends 26, 36 and the outer rib free ends 28, 38, for example. While forming the friction weld joints 82, 84, the upper post 64 and the lower post 74 remain entirely spaced from one another, though the respective free ends 65, 75 are caused to extend axially beyond one another, thereby forming the labyrinth seal passage 77 extending between the upper and lower posts 64, 74. Accordingly, with the upper post 64 and lower post 74 being entirely spaced from one another, they have no affect on the friction welding process.

Figure 2:
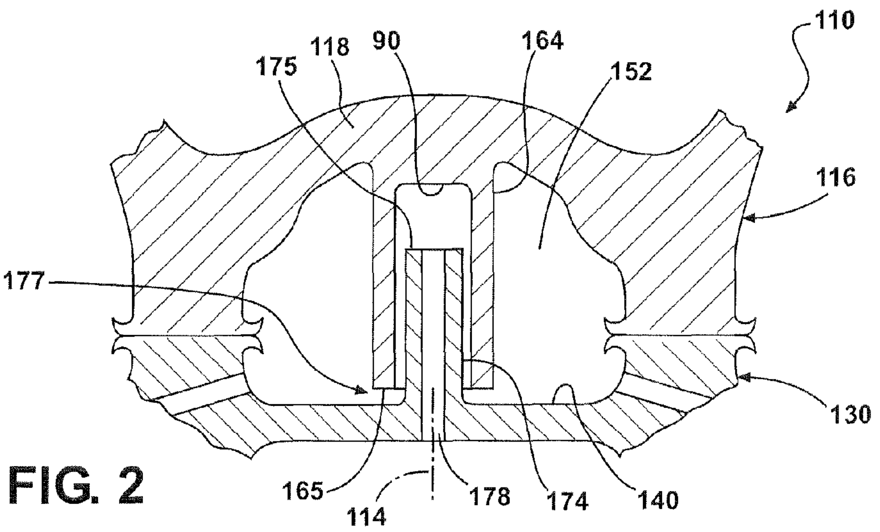
FIG. 2 is a partial cross-sectional view showing a central gallery portion of a piston constructed in accordance with another presently preferred aspect of the invention.

In FIG. 2, a portion of a piston 110 is shown constructed in accordance with another aspect of the invention, wherein the same reference numerals as used above, offset by a factor of 100, are used to identify like features. The piston 110 has an upper crown portion 116 fixed to a lower crown portion 130, such as via a friction welding process, as described above. The notable difference with the piston 110 is in the configuration of an upper post 164 and a lower post 174. The upper post 164 depends coaxially along a central axis 114 over a predetermined length from an upper combustion wall 118 to a free end 165 and has recessed pocket 90 extending upwardly into the free end 165 along the central axis 114 therein. The pocket 90 is constructed having a predetermined depth to a blind bottom surface, shown here, by way of example and with limitation, as extending to, or substantially to the upper combustion wall 118. Further, the pocket 90 has a predetermined diameter to receive the lower post 174 in clearance fit therein. Accordingly, a labyrinth seal passage 177 is established between the upper and lower posts 164, 174.

The lower post 174 extends coaxially upwardly along the central axis 114 a predetermined distance from an inner gallery floor 140 of the lower crown portion 130 to a free end 175. The lower post has an oil flow passage 178 formed as a central through passage extending coaxially along the central axis 114 through the free end 175. The lower post 174 is constructed having a predetermined length to remain axially spaced from the blind bottom surface of the pocket 90 and outer surface configuration or diameter to maintain a clearance fit within the pocket 90 of the upper post 164, while the free end 165 of the upper post 164 remains axially spaced from the inner gallery floor 140, thereby forming the serpentine labyrinth seal passage 177. The height of the lower post 174 can be varied in manufacture as desired to provide the desired clearance relative to the blind bottom surface of the pocket 90, thereby allowing the rate of oil flow through the oil flow passage 178 to be regulated, and further allowing a predetermined depth or pool of oil to be substantially maintained in a lower portion of a central gallery 152. Further, the diameter and radial width of the oil flow passage 178 can be sized to provide the desired flow rate of oil therethrough, thereby regulating the degree of oil heating within the central gallery 152, and thus, controlling the cooling of the piston 110. As with the previous embodiment, the upper post 164 and lower post 174 have no effect on the friction welding process.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:

a piston body having a central axis along which said piston body reciprocates within a cylinder bore, said piston body having an upper crown portion having an upper combustion wall against which combustion forces directly act in the cylinder bore and at least one annular upper rib depending from the upper combustion wall to a free end, said piston body further including a lower crown portion having at least one annular lower rib extending to a free end fixed to said at least one annular upper rib, said lower crown portion having an inner gallery floor extending radially inwardly relative to said at least one annular lower rib and a pair of pin bosses depending generally from said inner gallery floor with a space provided between said pin bosses for receipt of a small end of a connecting rod;

said upper crown portion having an upper post depending from said upper combustion wall along said central axis to a free end;

said lower crown portion having a lower post extending upwardly from said inner gallery floor along said central axis to a free end;

said upper post and said lower post being radially and entirely spaced from one another;

said free end of said upper post and said free end of said lower post extend axially beyond one another; and said free end of said upper post and said free end of said lower post forming a labyrinth passage.

2. The piston of claim 1 wherein said free end of said lower post has a counterbore and said free end of said upper post extends axially into said counterbore.

3. The piston of claim 2 wherein said lower post has a first oil flow passage extending along said central axis beneath said counterbore.

4. The piston of claim 1 wherein said lower post has a first oil flow passage extending along said central axis.

5. The piston of claim 4 wherein said first oil flow passage extends through said free end of said lower post.

6. The piston of claim 1 wherein said upper crown portion has a pair of annular upper ribs depending from the upper combustion wall to free ends and said lower crown portion has a pair of annular lower ribs extending to free ends fixed to said free ends of said pair of annular upper ribs.

7. A piston, comprising:

a piston body having a central axis along which said piston body reciprocates within a cylinder bore, said piston body having an upper crown portion having an upper combustion wall against which combustion forces directly act in the cylinder bore and at least one annular upper rib depending from the upper combustion wall to a free end, said piston body further including a lower crown portion having at least one annular lower rib extending to a free end fixed to said at least one annular upper rib, said lower crown portion having an inner gallery floor extending radially inwardly relative to said at least one annular lower rib and a pair of pin bosses depending generally from said inner gallery floor with a space provided between said pin bosses for receipt of a small end of a connecting rod;

said upper crown portion having an upper post depending from said upper combustion wall along said central axis to a free end;

said lower crown portion having a lower post extending upwardly from said inner gallery floor along said central axis to a free end, wherein a pocket extends axially into said free end of said upper post and said free end of said lower post extends axially into said pocket; and said free end of said upper post and said free end of said lower post forming a labyrinth passage.

8. The piston of claim 7 wherein said free end of said upper post and said free end of said lower post extend axially beyond one another.

9. The piston of claim 8 wherein said upper post and said lower post are spaced radially from one another.

10. The piston of claim 9 wherein said upper post and said lower post are entirely spaced from one another.

11. The piston of claim 7 wherein an oil flow through passage extends through said lower post along said central axis.

12. The piston of claim 7 wherein said free end of said upper post is spaced above said inner gallery floor.

13. A piston, comprising:

a piston body having a central axis along which said piston body reciprocates within a cylinder bore, said piston body having an upper crown portion having an upper combustion wall against which combustion forces directly act in the cylinder bore and at least one annular upper rib depending from the upper combustion wall to a free end, said piston body further including a lower crown portion having at least one annular lower rib extending to a free end fixed to said at least one annular upper rib, said lower crown portion having an inner gallery floor extending radially inwardly relative to said at least one annular lower rib and a pair of pin bosses depending generally from said inner gallery floor with a space provided between said pin bosses for receipt of a small end of a connecting rod;

said upper crown portion having an upper post depending from said upper combustion wall along said central axis to a free end;

said lower crown portion having a lower post extending upwardly from said inner gallery floor along said central axis to a free end, wherein said free end of said lower post has a counterbore and said free end of said upper post extends axially into said counterbore, wherein said lower post has a first oil flow passage extending along said central axis beneath said counterbore, and wherein said lower post has a second oil flow passage extending transverse to said central axis, said second oil flow passage intersecting said first oil flow passage; and said free end of said upper post and said free end of said lower post forming a labyrinth passage.

14. A piston, comprising:

a piston body having a central axis along which said piston body reciprocates within a cylinder bore, said piston body having an upper crown portion having an upper combustion wall against which combustion forces directly act in the cylinder bore and at least one annular upper rib depending from the upper combustion wall to a free end, said piston body further including a lower crown portion having at least one annular lower rib extending to a free end fixed to said at least one annular upper rib, said lower crown portion having an inner gallery floor extending radially inwardly relative to said at least one annular lower rib and a pair of pin bosses depending generally from said inner gallery floor with a space provided between said pin bosses for receipt of a small end of a connecting rod;

said upper crown portion having an upper post depending from said upper combustion wall along said central axis to a free end;

said lower crown portion having a lower post extending upwardly from said inner gallery floor along said central axis to a free end, wherein said lower post has a first oil flow passage extending along said central axis, and wherein said lower post has a second oil flow passage extending transverse to said central axis, said second oil flow passage intersecting said first oil flow passage; and said free end of said upper post and said free end of said lower post forming a labyrinth passage.

15. A method of constructing a piston, comprising:

providing an upper crown portion having an upper combustion wall against which combustion forces directly act in the cylinder bore and at least one annular upper rib depending from the upper combustion wall to a free end with an upper post depending from the upper combustion wall along the central axis to a free end;

providing a lower crown portion having at least one annular lower rib extending to a free end and an inner gallery floor extending radially inwardly relative to the at least one lower rib with a pair of pin bosses spaced for receipt of a small end of a connecting rod and having a lower post extending upwardly from the inner gallery floor along the central axis to a free end; and fixing the at least one upper rib of the upper crown portion to the at least one lower rib of the lower crown portion such that the upper post and the lower post are radially and entirely spaced from one another and the free end of the upper post and the free end of the lower post extend axially beyond one another and forming a labyrinth passage between the free end of the upper post and the free end of the lower post.

16. The method of claim 15 further including forming a counterbore in the free end of the lower post and extending the free end of the upper post axially into the counterbore.

17. The method of claim 16 further including forming a first oil flow passage extending along the central axis beneath said counterbore.

18. The method of claim 15 further including forming a first oil flow passage extending along the central axis in the lower post.

19. The method of claim 18 further including extending the first oil flow passage through the free end of the lower post.

20. The method of claim 15 further including forming the upper crown portion having a pair of annular upper ribs extending to free ends and forming the lower crown portion having a pair of annular lower ribs extending to free ends fixed to the free ends of the upper ribs.

21. A method of constructing a piston, comprising:

providing an upper crown portion having an upper combustion wall against which combustion forces directly act in the cylinder bore and at least one annular upper rib depending from the upper combustion wall to a free end with an upper post depending from the upper combustion wall along the central axis to a free end;

providing a lower crown portion having at least one annular lower rib extending to a free end and an inner gallery floor extending radially inwardly relative to the at least one lower rib with a pair of pin bosses spaced for receipt of a small end of a connecting rod and having a lower post extending upwardly from the inner gallery floor along the central axis to a free end;

fixing the at least one upper rib of the upper crown portion to the at least one lower rib of the lower crown portion and forming a labyrinth passage between the free end of the upper post and the free end of the lower post; and further including forming a pocket extending axially into the free end of the upper post and extending the free end of the lower post axially into the pocket.

22. The method of claim 21 further including extending the free end of the upper post and the free end of the lower post axially beyond one another.

23. The method of claim 22 further including maintaining the upper post and the lower post in entirely spaced relation from one another.

24. The method of claim 21 further including forming an oil flow passage extending along the central axis through the lower post.

25. A method of constructing a piston, comprising:

providing an upper crown portion having an upper combustion wall against which combustion forces directly act in the cylinder bore and at least one annular upper rib depending from the upper combustion wall to a free end with an upper post depending from the upper combustion wall along the central axis to a free end;

providing a lower crown portion having at least one annular lower rib extending to a free end and an inner gallery floor extending radially inwardly relative to the at least one lower rib with a air of s in bosses spaced for receipt of a small end of a connecting rod and having a lower post extending upwardly from the inner gallery floor along the central axis to a free end;

fixing the at least one upper rib of the upper crown portion to the at least one lower rib of the lower crown portion and forming a labyrinth passage between the free end of the upper post and the free end of the lower post;

forming a counterbore in the free end of the lower post and extending the free end of the upper post axially into the counterbore;

forming a first oil flow passage extending along the central axis beneath said counterbore; and further including forming a second oil flow passage extending transverse to the central axis and intersecting the first oil flow passage with the second oil flow passage.

26. A method of constructing a piston, comprising:

providing an upper crown portion having an upper combustion wall against which combustion forces directly act in the cylinder bore and at least one annular upper rib depending from the upper combustion wall to a free end with an upper post depending from the upper combustion wall along the central axis to a free end;

providing a lower crown portion having at least one annular lower rib extending to a free end and an inner gallery floor extending radially inwardly relative to the at least one lower rib with a pair of pin bosses spaced for receipt of a small end of a connecting rod and having a lower post extending upwardly from the inner gallery floor along the central axis to a free end;

fixing the at least one upper rib of the upper crown portion to the at least one lower rib of the lower crown portion and forming a labyrinth passage between the free end of the upper post and the free end of the lower post;

forming a first oil flow passage extending along the central axis in the lower post; and further including forming a second oil flow passage extending transverse to the central axis and intersecting the first oil flow passage with the second oil flow passage.

* * * * *